O. ENGLUND.
CARPET CLEANER.
APPLICATION FILED DEC. 26, 1914.
1,155,556.  Patented Oct. 5, 1915.
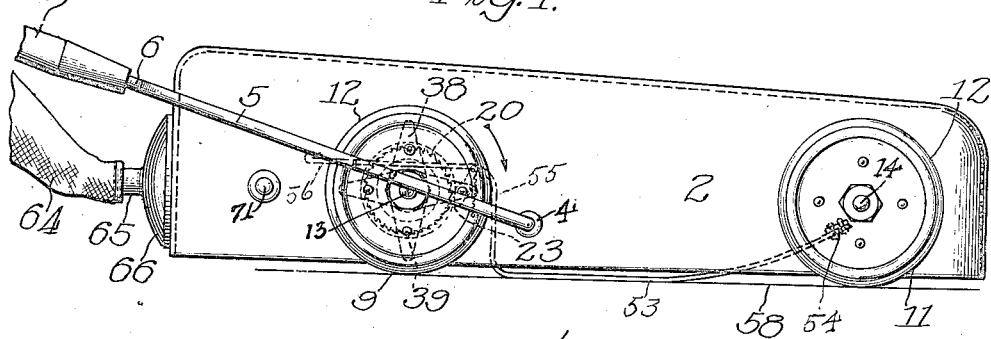
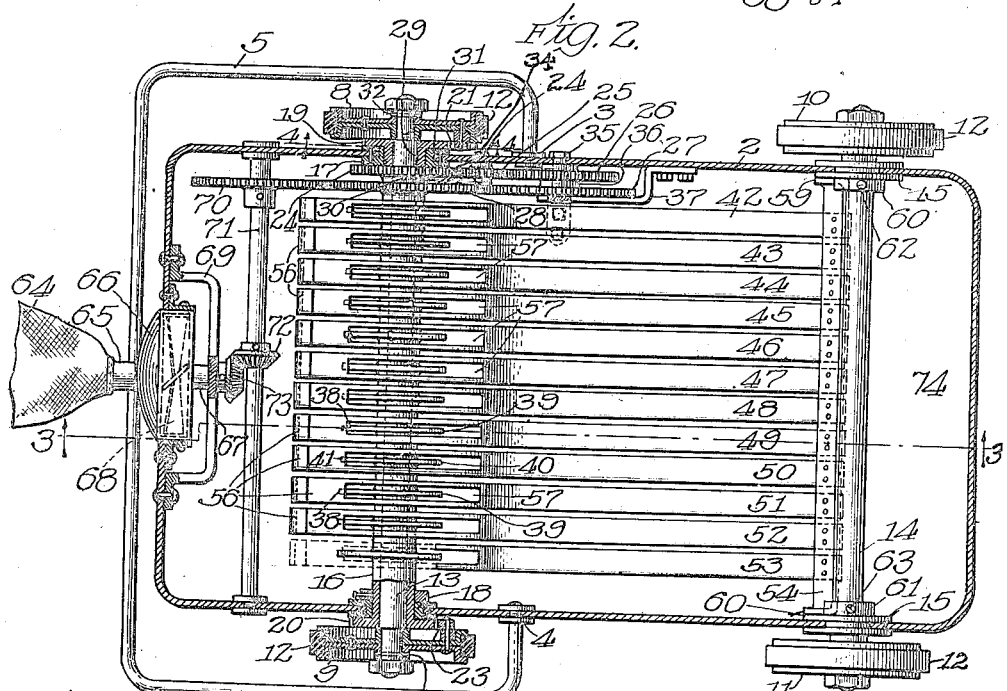
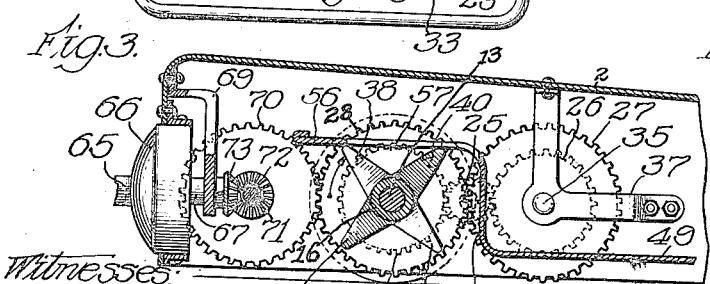
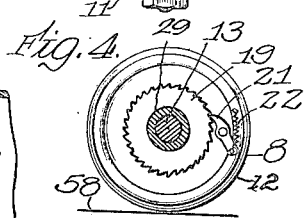

UNITED STATES PATENT OFFICE.

OLOF ENGLUND, OF CHICAGO, ILLINOIS.

CARPET-CLEANER.

1,155,556. Specification of Letters Patent. Patented Oct. 5, 1915.

Application filed December 26, 1914. Serial No. 879,028.

*To all whom it may concern:*

Be it known that I, OLOF ENGLUND, a subject of the King of Sweden, residing at Chicago, in the county of Cook and State of Illinois, have invented certain new and useful Improvements in Carpet-Cleaners, of which the following is a specification.

My invention relates to carpet cleaning devices, and its object is to provide a machine of the ordinary carpet sweeper form and to be manipulated in the same manner, but which substitutes beating and suction means for the brushes. To this end my invention provides a series of light and rapidly operable beaters and sufficient blower or suction means to collect liberated dust, and the invention consists in the novel construction, combination and arrangement of parts, all as hereinafter described in detail, illustrated in the accompanying drawing and incorporated in the appended claims.

In the drawing—Figure 1 is a side elevation of a machine embodying my invention, the handle and the dust bag to be partly supported thereon being partly broken away and part of the interior mechanism shown by dotted lines. Fig. 2 is a bottom sectional plan view of the machine partly broken away as in Fig. 1. Fig. 3 is a partly broken away section taken substantially on line 3—3 of Fig. 2. Fig. 4 is a section on line 4—4 of Fig. 2 and represents one of the two substantially indentically but oppositely acting ratchet wheels and pawls associated with the two driving wheels.

In the several views 2 represents a casing similar to the usual carpet sweeper body, hood or casing to which is pivoted at 3 and 4 a fork 5 carrying a rod 6 provided with a handle 7. This body is carried on wheels 8, 9, 10 and 11 having rubber tires 12. The wheels 8 and 9 are keyed to the shaft 13, which rotates, and the wheels 10 and 11 are loose on the shaft 14 which is stationary in the frame and held in bearings 15. The shaft 13 is rotatable within a tubular shaft, or sleeve 16. On the lower end (Fig. 2) of the sleeve 16 is secured a ratchet wheel 20, and on the upper end of the shaft 13 is rotatable a similar ratchet wheel 19. A side view of the wheel 19 is shown in Fig. 4 and a side view of the wheel 20 is shown by dotted lines in Fig. 1. The ratchet teeth on one wheel are shown projecting tangentially opposite to the other wheel. On the wheel 8 is pivoted a pawl 21 to engage the teeth on the wheel 19 and the wheel 9 carries a similar pawl —23— to engage the wheel 20. A spring 22 holds the pawl 21 against the teeth on the wheel 19 and the pawl 23 is similarly held against its wheel. The pawls 21 and 23 are arranged opposite to each other, as indicated in Figs. 1 and 4. Hence only one pawl at a time is active. One end of the sleeve 16 is supported in a bearing 18 on the body 2. Its other end is supported on the shaft 13 which has its support in a hub 29 on the ratchet wheel 19, and this hub is supported in a bearing 31 secured to the frame as by screws or rivets 17. On the hub 29 is secured by a pin 30 a gear wheel 24, and on the upper end of the sleeve 16 (Fig. 2) is secured in any suitable manner a gear wheel 28.

The sleeve 16 carries the beater actuators and is caused to rotate in the same direction whether the machine is pulled in one direction or pushed in the other direction, by means of a train of gears 25, 26 and 27 operatively connecting the wheels 24 and 28. The traction wheels 8 and 9 are secured to the shaft 13 by means of pins 32 and 33.

The wheel 25 is revolubly mounted on a stud shaft 34 secured to the side of the body 2 and the wheels 26 and 27 are similarly mounted on a stud shaft 35 and these wheels are coupled together by a hub 36 is any suitable manner. As the shaft 35 is longer than the shaft 34 the inner end of the shaft 35 is supported by a bracket 37. To the hollow shaft 16 are secured pairs of cams 38 and 39 and at right angles thereto and in alternate arrangement similar pairs of cams 40 and 41. If desired each set 38, 39 or 40, 41 may consists of more than two projections from the shaft 16 and their relative angular positions may be varied in numerous ways. Each said set 38 and 39 and 40 and 41 actuates a beater, twelve of which, numbered 42 to 53, being shown in Fig. 2. These beaters which may be of any suitable substance are in the present illustrations shown as light springs secured at one end to a bar 54 which extends across the body of the machine.

As shown in Figs. 1 and 3 the free end of each spring is bent to form a vertical portion 55 and a horizontal portion 56, the latter having a slot 57 therein through which the cams 38 and 39 or 40 and 41 pass after engaging and lifting the extreme outer end as in Fig. 3. These beaters are shown as normally touching the line 58 which may represent the floor or carpet, but their operativeness does not depend upon such normal contact and they may be suspended slightly above the floor or carpet level the spring tension causing them to pass the normally suspended position and strike the carpet when released by the cams. Adjustability of the position of the springs or beaters relatively to the rug or carpet is provided for by mounting the bar 54 on lugs 59 and 60 projecting from collars 61 which encircle the shaft 14 and are held against rotation on the shaft by means of set screws 62 and 63.

The dust released by the beaters is drawn from the interior space and blown into a bag 64 secured to a nipple 65 at its inlet end and supported in any suitable or ordinary manner on the handle. The nipple 65 leads into a hood 66. Within this hood is mounted on a shaft 67 a fan or blower 68. One end of the shaft 67 is mounted in a bearing bracket 69 suitably secured to the interior wall of the body 2, and said shaft 67 is rotated by the gear wheel 28 through the medium of a similar wheel 70 keyed to a shaft 71 having keyed thereon a miter gear 72 meshing with a similar gear 73 on the shaft 67. The ends of the shaft 71 are rotatably mounted in the sides of the body 2 in any suitable manner.

Looking at Figs. 1 and 2, when the machine moves to the right, or forwardly, the pawl 23 engages and rotates the ratchet wheel 20 and the sleeve 16 to the right, or clockwise which causes the ratchet wheel 19 at the other end of the shafts to rotate to the left, or contra-clockwise, and its pawl 21 to drag idly over the backs of the teeth. When, on the other hand, the machine is moved backward, or to the left, the pawl 21 on the other traction wheel 8 engages and rotates the ratchet wheel 19, and the pawl 23 on the wheel 9 glides idly over the backs of the ratchet teeth on wheel 20. The engagement of the pawl 21 rotates the wheels 19 and 24, which are both secured to the hub 29, to the left or contra-clockwise. This contra-clockwise movement is by the train of gears 25, 26 and 27 changed to clockwise in the wheel 28 and its shaft 16. Thus the hollow shaft or sleeve 16 with its cams 38 to 41 always rotates to the right whether the machine be pushed to the right or pulled to the left. The inner shaft 13 and the wheels 8 and 9 form one single rigid member, while the sleeve 16, its cams and the ratchet wheel 20 and gear wheel 28 form another rigid member and the other ratchet wheel with the wheel 24 and the hub 29 form a third rigid member. When the machine moves to the right the first two of said substantially rigid members move as one piece, and when the machine moves to the left they move in opposite directions rotatably as separate members.

I claim as my invention—

1. The combination with a hood, of a series of beater arms arranged substantially parallel to the surface of a carpet and the like, traction wheels upon which said hood is mounted, means actuated by said wheels for actuating said beaters whether said hood is moved forward or backward on said wheels, and means for collecting dust released within said hood.

2. The combination with a hood, of a series of springs fixedly mounted at one end and normally free at the other, means for adjusting said springs to vary their positions, means for lifting the free ends of said springs and releasing them to beat against a carpet on which said hood is movable, and means for collecting dust released from a carpet by said beaters.

3. The combination with a hood, of a series of springs to serve as beaters, a revolubly adjustable support to which one end of each of said springs is secured, cams for lifting and releasing said springs to cause them to beat against a carpet, and means for actuating said cams on both forward and backward movement of said hood to move in the same direction, a fan for collecting the dust released by said beaters, and a receptacle into which dust released by the beaters is forced by said fan.

In testimony whereof I have hereunto set my hand in the presence of two subscribing witnesses.

OLOF ENGLUND.

Witnesses:
ROBERT BAUERLE,
J. W. BECKSTROM.